United States Patent
Albertini et al.

(10) Patent No.: US 6,914,774 B1
(45) Date of Patent: Jul. 5, 2005

(54) TRANSPARENT COVER WITH ACCESS TO MULTI-WAY NAVIGATION ASSEMBLY

(75) Inventors: Michael Albertini, La Grange, IL (US); Frank Annerino, Rolling Meadows, IL (US); Ben Dettmann, Sunnyvale, CA (US); Troy Hulick, Saratoga, CA (US); William Webb, Redwood City, CA (US)

(73) Assignee: palmOne, Inc., Milpitas, CA (US)

( * ) Notice: Subject to any disclaimer, the term of this patent is extended or adjusted under 35 U.S.C. 154(b) by 0 days.

(21) Appl. No.: 10/375,999

(22) Filed: Feb. 27, 2003

(51) Int. Cl.[7] .................................................. G06F 1/16
(52) U.S. Cl. ...................... 361/683; 361/679; 345/156; 345/179; 455/90
(58) Field of Search ................................. 361/679–683, 361/684, 686; 345/156, 179, 168, 169, 905; 400/691–693; 220/581, 836, 843, 845, 811, 813, 815, 4.22, 848, 4.23; 206/38, 214, 232, 472, 471, 320; 16/319, 284, 292, 317, 297, 223, 235; 379/433.01; 429/26; 248/632–634

(56) References Cited

U.S. PATENT DOCUMENTS

| | | | | |
|---|---|---|---|---|
| 4,992,631 A | * | 2/1991 | Gee | 200/5 A |
| 5,583,742 A | * | 12/1996 | Noda et al. | 361/683 |
| 6,239,968 B1 | * | 5/2001 | Kim et al. | 361/679 |
| 6,313,731 B1 | * | 11/2001 | Vance | 333/185 |
| 6,415,138 B2 | * | 7/2002 | Sirola et al. | 455/90 |
| 6,471,056 B1 | * | 10/2002 | Tzeng | 206/320 |
| 6,536,589 B2 | * | 3/2003 | Chang | 206/320 |
| 2002/0071550 A1 | * | 6/2002 | Pletikosa | 379/433.01 |
| 2002/0101411 A1 | * | 8/2002 | Chang | 345/179 |
| 2003/0160754 A1 | * | 8/2003 | Hanson et al. | 345/156 |

FOREIGN PATENT DOCUMENTS

JP            410301688 A    * 11/1998    ............. G06F/3/02

* cited by examiner

*Primary Examiner*—Michael Datskovsky
(74) *Attorney, Agent, or Firm*—Wagner, Murabito & Hao LLP

(57) ABSTRACT

A cover for an electronic device made of a transparent material and having a form factor that protects function buttons of the device from inadvertent actuation. The cover has an opening of a size, shape and location to afford access to an interface device for multi-way navigation with the cover in place. Protrusions in tabs at the sides of the cover snap into cutouts located midway along the side of the electronic device and may be used to hold the cover in place. The cover may be stored on the back of the device while the device is in use. The transparent nature of the cover affords viewing of a display screen with the cover in place.

37 Claims, 15 Drawing Sheets

TRANSPARENT COVER WITH ACCESS TO MULTI-WAY NAVIGATION ASSEMBLY

BACKGROUND OF THE INVENTION

1. Field of the Invention

The present invention relates to the field of portable electronic devices, such as personal digital assistants or handheld computer systems. Specifically, the present invention relates to a protective transparent cover allowing access to an interface mechanism for navigating among applications with the protective cover in place.

2. Related Art

A portable computer system, such as a personal digital assistant (PDA) or handheld computer, is an electronic device that is small enough to be held in the hand of a user. By virtue of their size, portable computer systems are lightweight and so are exceptionally portable and convenient. Portable computer systems are rapidly becoming smaller and at the same time, increasing functionality and user friendliness.

These systems, and others like them, have in common some type of screen for displaying images as part of a user interface. Many different kinds of screens can be used, such as liquid crystal displays, field emission displays or other types of flat screen displays. Many have keyboards that can be displayed on a touch screen and selected with a stylus. Many have the capability of reading handwritten memos. Recently, complete keyboards have been incorporated in the form of small depressible buttons on the housing of the devices.

These systems also have in common some type of user interface allowing a user to input commands and information and to navigate either within an application or from one application to another. Handheld computers and many other handheld devices typically have multiple built-in, dedicated or programmable buttons or keys that can be used to implement various functions and to navigate among and within different applications. Some also have a one-touch navigation assembly that allows scrolling in four directions and making a selection from a single central location on the housing.

In order to protect these pocket-sized devices from being inadvertently activated while in a pocket, briefcase, purse or other transport facility, many of these devices have protective covers that cover the buttons. FIGS. 1A and 1B illustrate two embodiments of covers found in the prior art. FIG. 1A illustrates a rigid flip cover that snaps onto a PDA device at the back of the device and is lifted to provide access to the buttons and display screen. A flip cover needs a solid connection to the device, which then becomes difficult to remove when so desired. When the cover is in place, the device cannot be used. Once lifted, the cover can prove to be unwieldy when attempting to hold the PDA while using it.

FIG. 1B illustrates another example of covers found on handheld computer devices in the prior art. In this example, the cover is in the form of a rigid notebook style cover that has a flexible frame on one side into which the device may be slipped. The frame fits around the perimeter of the device and below the navigation buttons and has a strip that fits above the navigation buttons but below the screen to further secure the device in the cover. This cover, as with the cover of FIG. 1A, proves uncomfortable for holding while navigating or executing applications. The device is best used, while in the cover, when placed on a flat surface. In neither of the embodiments shown in FIGS. 1A and 1B does the cover lend itself to comfortably navigating with one hand, and in both embodiments the cover must be lifted or removed in order to access the navigation buttons. There are a number of types of covers available in the prior art, but they either do rot allow for easy release, or they do not allow for use of the handheld device while in place.

Referring to Prior Art FIG. 2A, an exemplary handheld electronic computing device 200a is illustrated, according to one embodiment of the prior art. Device 200a is configured for single-handed navigation utilizing a ring and button assembly. In the present embodiment, navigation ring 210 and button 215 are located at the lower portion of the face of device 200a and the ring 210 may be pressed at positions corresponding to twelve o'clock, three o'clock, six o'clock and nine o'clock to cause a highlighting feature to move up, right, down and left, respectively, among icons on display screen 220. The highlighted icon may be selected by pressing button 215.

The ring and button assembly has the advantage of performing multiple functions using one hand within a concentrated area. The present assembly is relatively large and occupies a considerable amount of space on housing 225 of FIG. 2A. Some newer handheld devices are incorporating additional function buttons and even complete keyboards. With the ever-increasing need for smaller form factors and additional function keys, it would be desirable to have a navigation ring and button assembly that is smaller in size than the current design.

Prior Art FIG. 2B illustrates actuator devices 200b used in one embodiment of the prior art. Actuators 230, 240, 250, 260 and 270 are small, depressible steel domes placed in a matrix with circuitry below for communicating with the handheld device. The ring 210 of FIG. 2A would fit over outer four domes 230, 240, 250 and 260 and button 215 of FIG. 2A would fit above center dome 270. In order to achieve up, down, right and left movement and a select function, 5 domes are used. The dome can be cycled (e.g., pressed and released) only a limited number of times during its lifetime. The larger the dome, the greater the number of cycles in a lifetime. Thus, to maintain reliability, it would not be desirable to reduce the size of the domes to fit a smaller space. The spacing between the domes allows the sides of the ring and button to have sufficient clearance for movement.

In summary, prior art mechanisms for protecting handheld devices are problematic. A solution to the problems described above would be advantageous. The present invention, in various embodiments, provides such a solution.

SUMMARY OF THE INVENTION

The present invention provides an apparatus for a navigational interface with a portable electronic device. The present invention would allow for an increase in the number of function keys and/or a reduction in device size to more fully utilize the advantages afforded by the portability of handheld devices. An improved interface may facilitate the user's experience and thus provide an advantage over other devices that employ conventional user interfaces.

In one embodiment, the present invention is implemented as a cover for an electronic device comprising a transparent material and having a form factor that protects function buttons of the device from inadvertent actuation. The cover has an opening of a size, shape and location to afford access to an interface device for a multi-way navigation assembly located on the top face of the device, the opening allowing for navigating with the cover in place.

According to one embodiment, the cover has protrusions that snap into cutouts located midway along the side of the electronic device. The cover may be stored on the back of the device while the device is in use. According to one embodiment, the opening in the cover is circular.

In one embodiment, the multi-way navigation assembly comprises actuators coupled to circuitry within the electronic device. According to one embodiment, the actuators are steel domes. The actuators may be actuated, according to one embodiment, by the interface device, wherein the interface device comprises a ring surrounding a central button.

In one embodiment, the ring interfaces with actuators on a first plane and the button interfaces with actuators on a second plane, through an opening in the first plane. According to one embodiment, the first plane is offset from the second plane so that a space between the actuators in the first plane aligns on an orthogonal axis with the actuator of the second plane. In one embodiment, the button comprises an extension for depressing the actuator on the second plane through the opening in the first plane.

According to one embodiment, the power switch on the device is accessible with the cover in place. In one embodiment, the electronic device is a portable digital assistant. In another embodiment, the electronic device is a global positioning system. In yet another embodiment, the electronic device is a portable game.

These and other objects and advantages of the present invention will become obvious to those of ordinary skill in the art after having read the following detailed description of the preferred embodiments which are illustrated in the various drawing figures.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

The present invention is described primarily in the context of a portable computer system, e.g., a handheld or personal digital assistant (PDA). However, it is understood that the present invention is not limited to implementation in portable computer systems, but can also be implemented in other portable electronic devices such as cell phones, global positioning system devices, electronic games, mobile phones and the like. Indeed, aspects of the present invention can be implemented in numerous electronic devices in which it is necessary or desirable to navigate among functions while a protective cover remains in place or to reduce the device size while maintaining or increasing functionality.

Figure 1A:
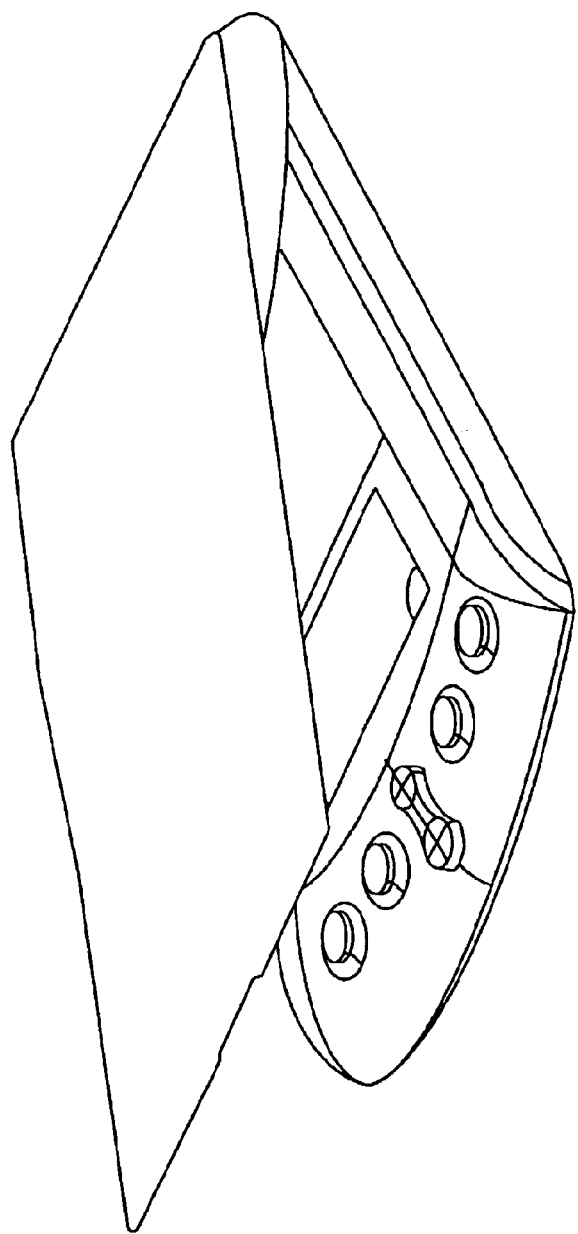
FIG. 1A illustrates a cover for a handheld electronic device in accordance with one embodiment of the prior art.
Figure 1B:
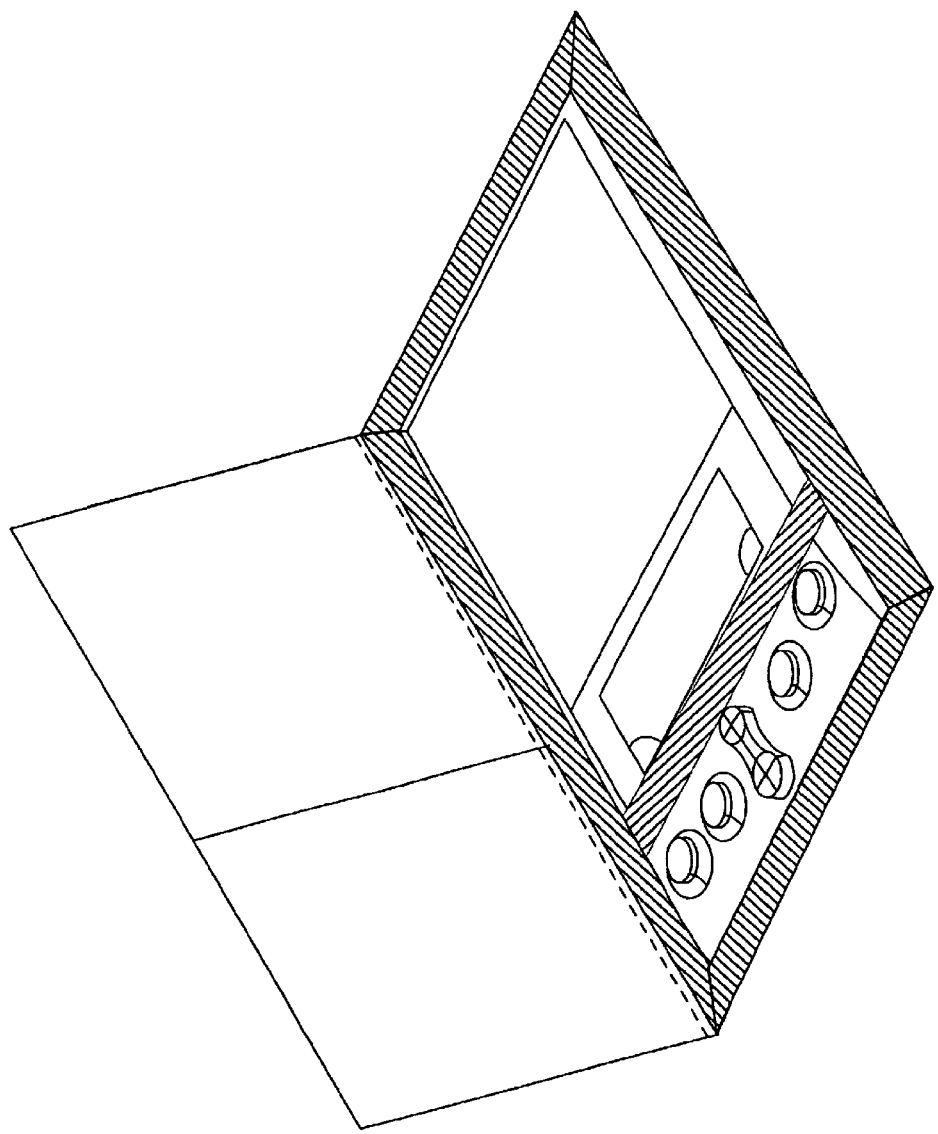
FIG. 1B illustrates a handheld electronic device having a cover in accordance with one prior art embodiment.
Figure 2A:
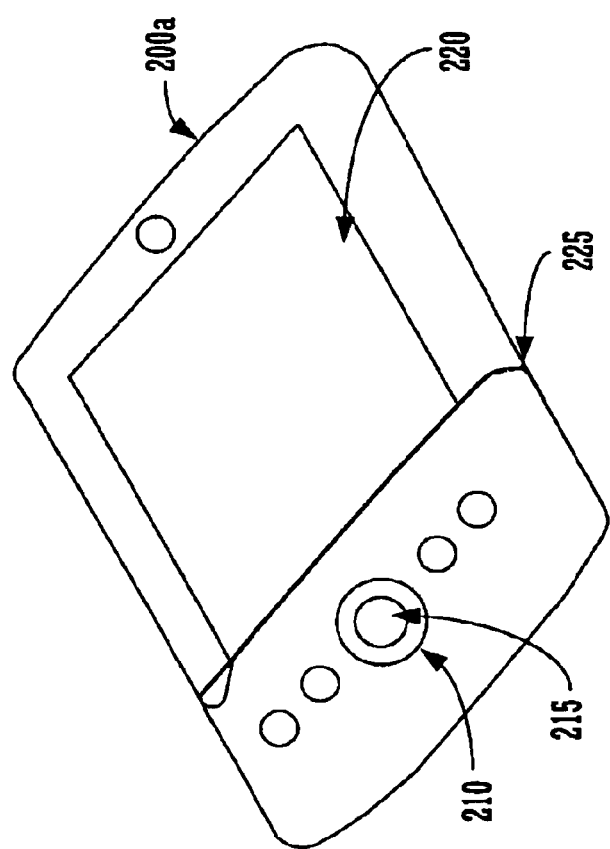
FIG. 2A illustrates a prior art electronic device with a ring and select button device for navigating among menu items.
Figure 2B:
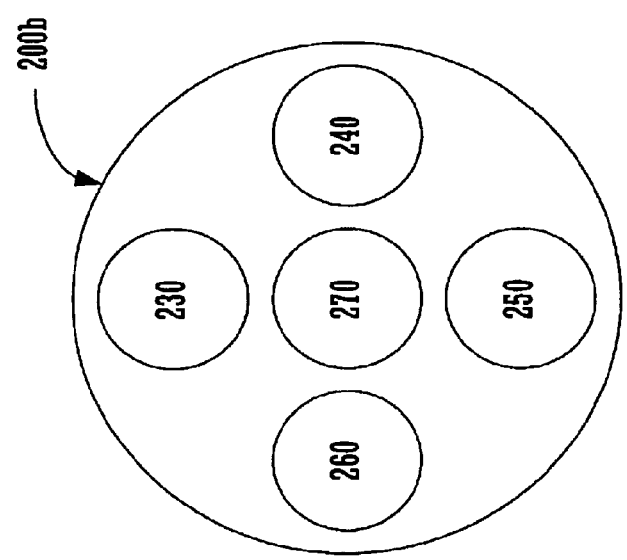
FIG. 2B illustrates a prior art arrangement of domed actuators for connecting a ring and button device to circuitry.
Figure 3A:
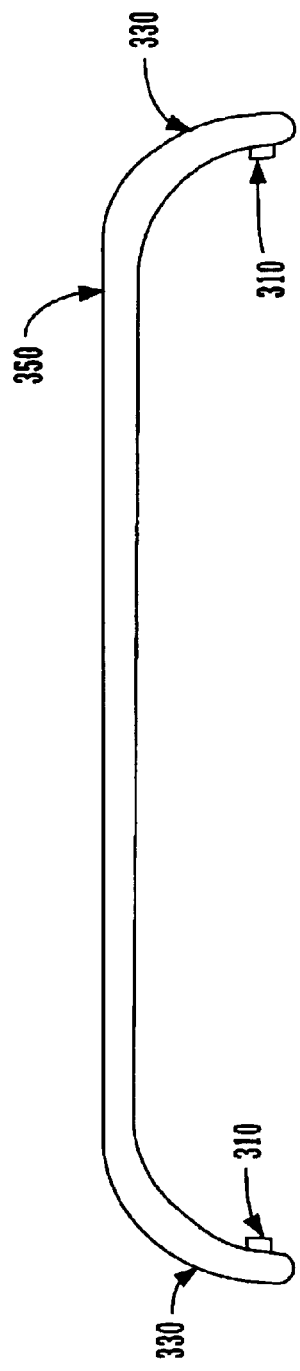
FIG. 3A illustrates a perspective front side view of a cover designed to allow navigation, according to one embodiment of the present invention.

FIG. 3A is an illustration of a front side view 300a of a cover 350 designed to allow navigation, according to one embodiment of the present invention. While in place, cover 350 protects a device from inadvertent activation. Cover 350 is substantially transparent so as to allow a display screen to be read while cover 350 is in place. Cover 350 may or may not be removable. In this embodiment, cover 350 has tabs 330 at the center portion of each side that are designed to fit over the side of a handheld electronic device.

Cover 350 is held in place by protrusions 310 on the inside of tabs 330 that fit into cutouts in the sides of the device. Cover 350 is not limited to snapping in place. In one embodiment, cover 350 may slide into place. In another embodiment, cover 350 may pivot into place. Cover 350 may be constructed of any suitable rigid or semi-rigid material that is transparent so that the display screen is readable with cover in place.

Figure 3B:
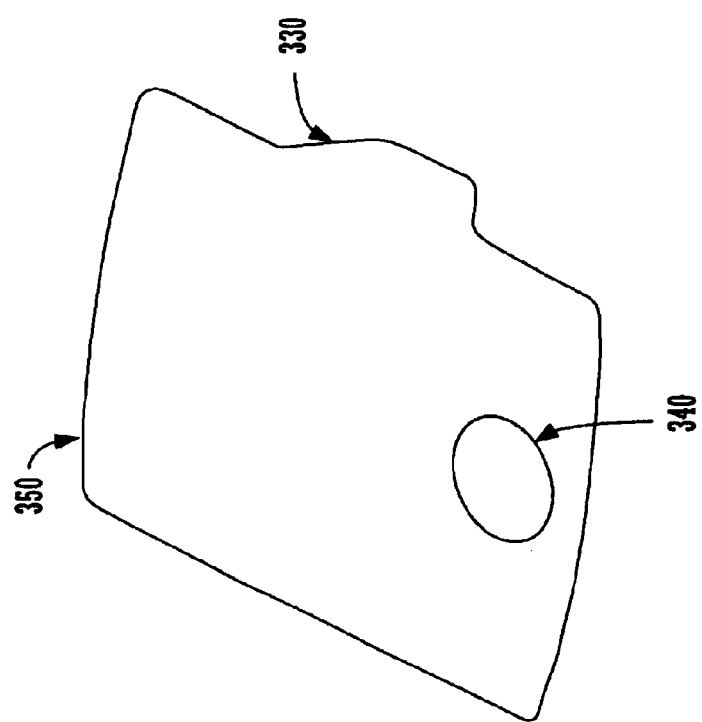
FIG. 3B is an illustration of a top side view of a cover designed to allow navigation while in place, according to one embodiment of the present invention.

FIG. 3B illustrates a perspective top side view 300b of a transparent removable cover 350 designed to allow navigation while in place with a multi-way navigation assembly, according to one embodiment of the present invention. Tabs 330 at each side of cover 350 fit over a handheld device and snap into cutouts at the midpoints of the sides of the device to secure the cover to the device. Cover 350 may be secured to the device, either on the front for protection of the screen and function buttons, or on the back when the device is in use.

Figure 3C:
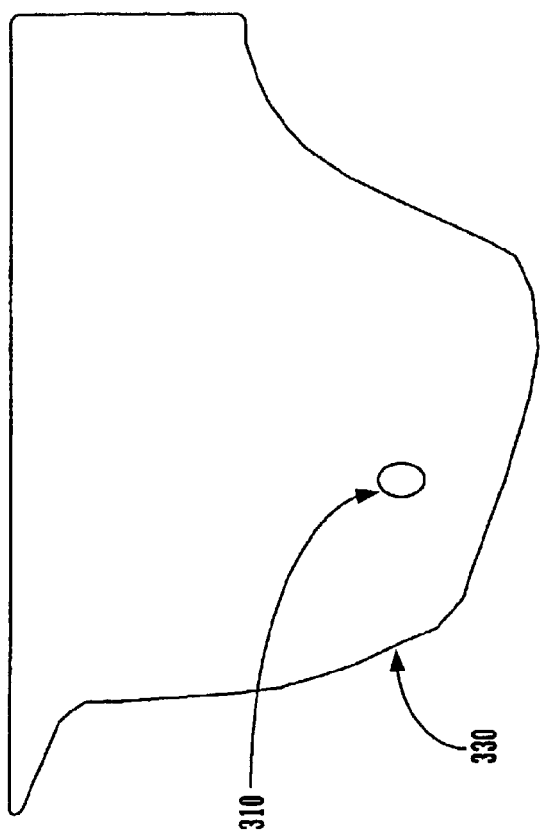
FIG. 3C is an inside view illustrating a protrusion on a tab of a cover designed to snap into a cutout in the side of a handheld device to hold the cover in place, according to one embodiment of the present invention.

FIG. 3C is an inside view 300c illustrating a protrusion 310 on tab 330 of a transparent removable cover (e.g., cover 350 of FIG. 3B). Protrusion 310 is designed to snap into a cutout in the side of a handheld device to hold cover 300b in place, according to one embodiment of the present invention.

Figure 4A:
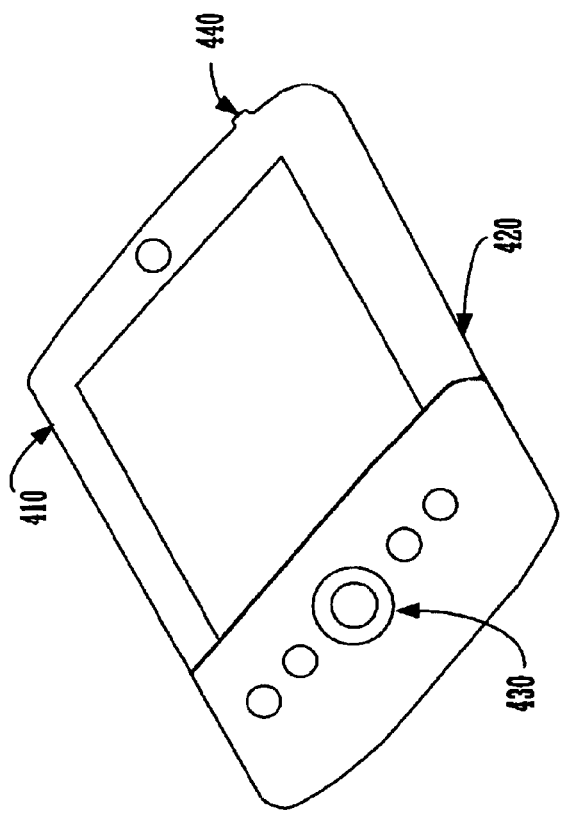
FIG. 4A illustrates a portable electronic device in accordance with one embodiment of the present invention

FIG. 4A illustrates a top view 400a of a portable electronic device 410 in accordance with one embodiment of the present invention. In this embodiment, device 410 has a cutout 420 at the midline of each side that may accept protrusions (e.g., protrusion 310 of FIG. 3A) on side tabs of a cover (e.g., cover 350 of FIGS. 3A and 3B). Electronic device 410 also has a ring and button interface device 430 for navigating among and selecting applications via icons on a display screen, for example.

Power switch 440 is located, according to one embodiment, on the back of device 410 so that it is not prone to inadvertent activation. Opening 340 on cover 350 of FIG. 3B may be sized to fit around interface 430 so that applications may be selected with transparent cover 350 still in place. Cover 350 does not extend over power switch 440 so that power switch 440 is accessible with cover 350 in place. Thus device 410 may be powered on or awakened without removing cover 350 and applications may be selected by means of navigation interface 430 that is available through opening 340.

It is understood that, although electronic device 410 is illustrated herein in the context of a portable computer system, e.g., a handheld or personal digital assistant (PDA), the present invention is not limited to implementation in portable computer systems, but can also be implemented in other portable electronic devices such as cell phones, global positioning system devices, electronic games, mobile phones and the like.

Figure 4B:
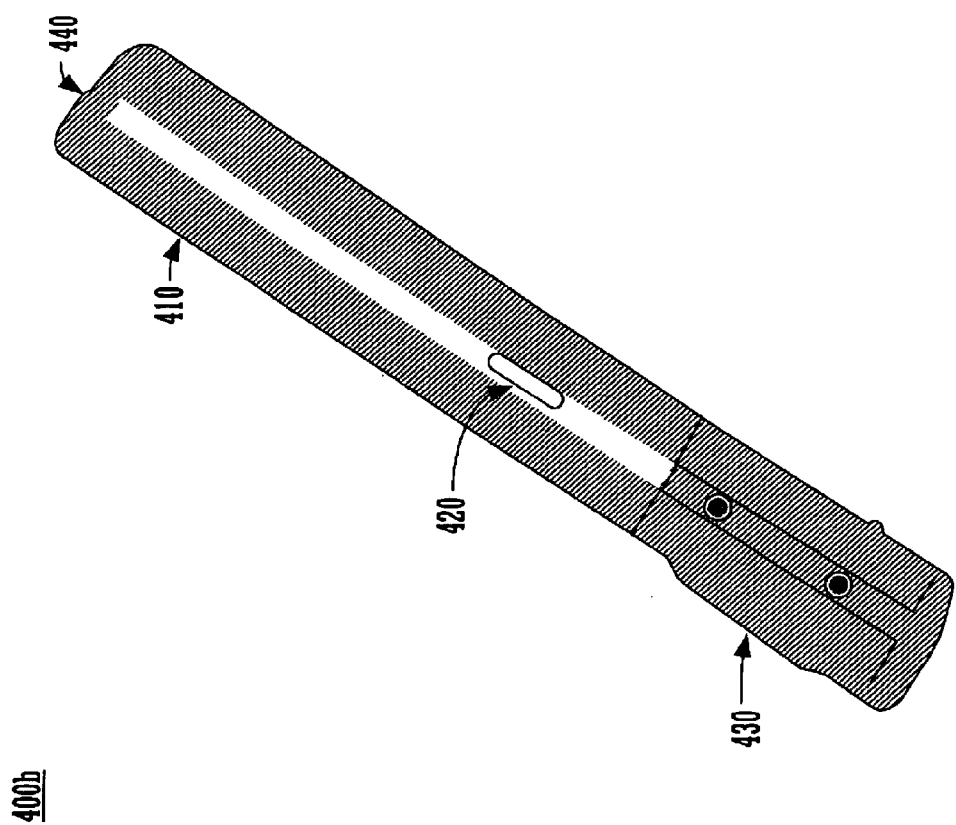
FIG. 4B illustrates a side view of a portable electronic device having a cutout for accepting protrusions in a transparent removable cover.

FIG. 4B illustrates a side view 400b of one embodiment of a portable electronic device 410 having a cutout for accepting protrusions in a cover. It may be observed that the cutout is at the midline of the side so that cover 350 may be removed and stored on the back of the electronic device while the device is in use.

Figure 5A:
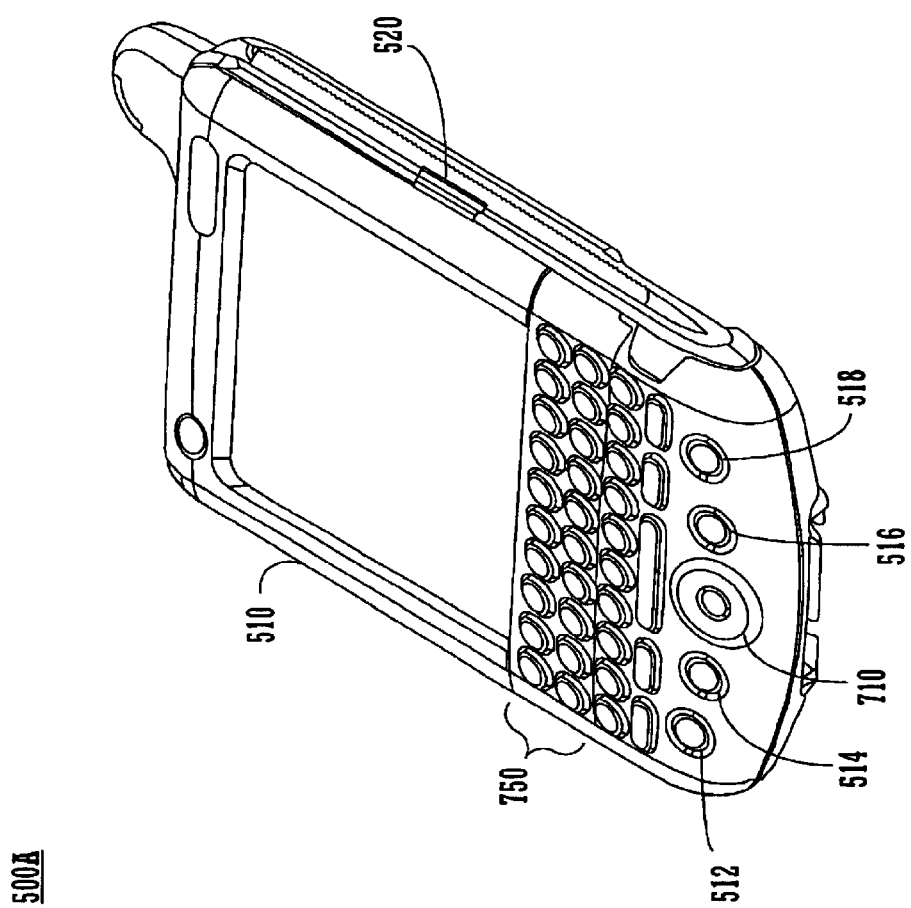
FIG. 5A illustrates a portable electronic device having a cutout for accepting protrusion in a transparent removable cover.

FIG. 5A illustrates a top perspective view 500a of another embodiment of a portable electronic device 510 having a cutout 520 for accepting protrusions on a tab on a cover. Portable electronic device 510 is shown having a keyboard 750, function buttons 512, 514, 516 and 518 for such functions as checking mail, dialing a wireless phone, checking phone messages, or connecting to the Internet, and a multi-way navigation interface device 710. In order to accommodate a keyboard and maintain the form factor of a device such as device 410 of FIG. 4A, interface device 710 may be reduced in size from that of interface device 430 of FIG. 4A.

Figure 5B:
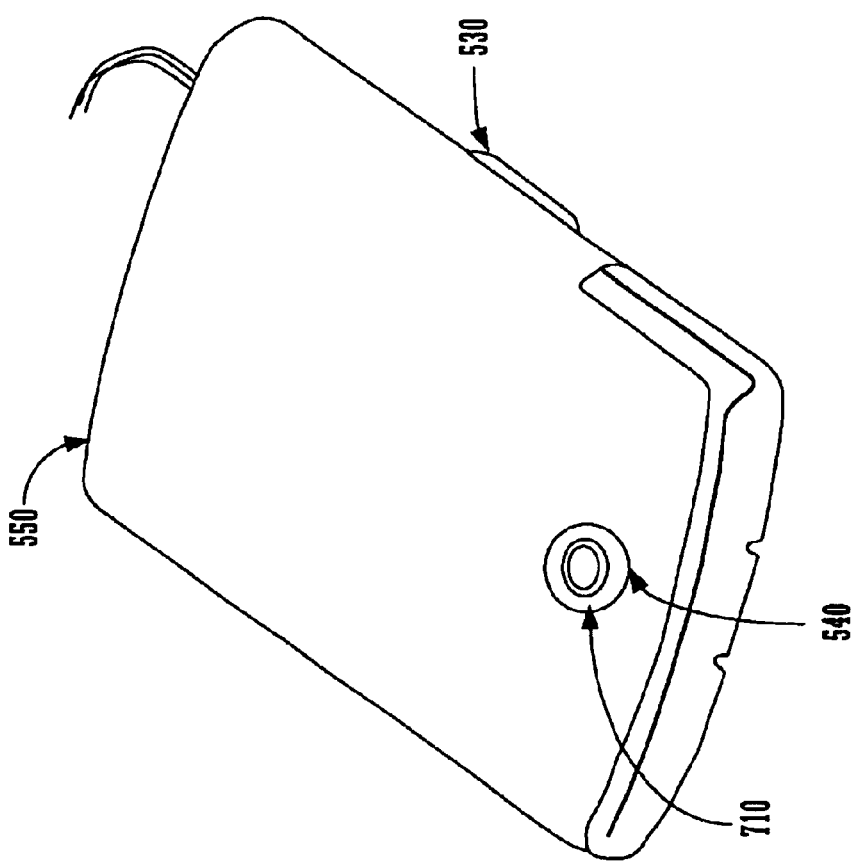
FIG. 5B illustrates a top view of a portable electronic device having a transparent removable cover in place according to one embodiment of the present invention.

FIG. 5B illustrates a top view 500b of a portable electronic device (e.g., device 510 of FIG. 5A) having a transparent removable cover 550 in place, according to one embodiment. Cover 550 is shown with opening 540 that is sized and located to fit around navigation interface device 710, according to one embodiment, thus affording a user access to navigate among applications with cover 550 in place. In another embodiment, cover 550 may have multiple openings to allow access to other function or navigation buttons such as, for example, buttons 512, 514, 516 and 518 of FIG. 5A. It is understood that, in various embodiments, a variety of openings of varying shapes, sizes and locations may be located within cover 550 to accommodate a device for which cover 550 is designed.

Figure 6:
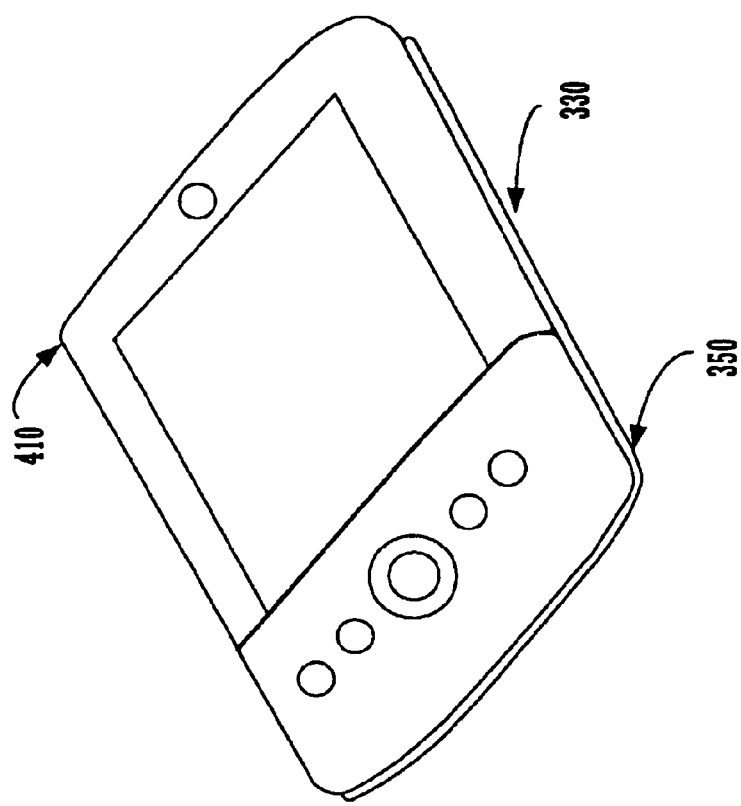
FIG. 6 illustrates a top view of a portable electronic device having a transparent removable cover stored on the back in accordance with one embodiment of the present invention.

FIG. 6 illustrates a top view 600 of portable electronic device 410 having transparent removable cover 350 stored on the back, in accordance with one embodiment of the present invention. Cover 350 may be removed and stored on the back, held by protrusions (e.g., protrusions 310 of FIG. 3A) on the inside of tabs 330 into cutouts (e.g., cutouts 420 of FIG. 4B) on the midline of device 410. It is understood, however, that cover 350 is not limited to being removable and snapping on and off. In other embodiments, cover 350 may slide up and down or left and right, or, according to one embodiment, cover 350 may pivot from a single pivot point or from two pivot points.

Figure 7A:
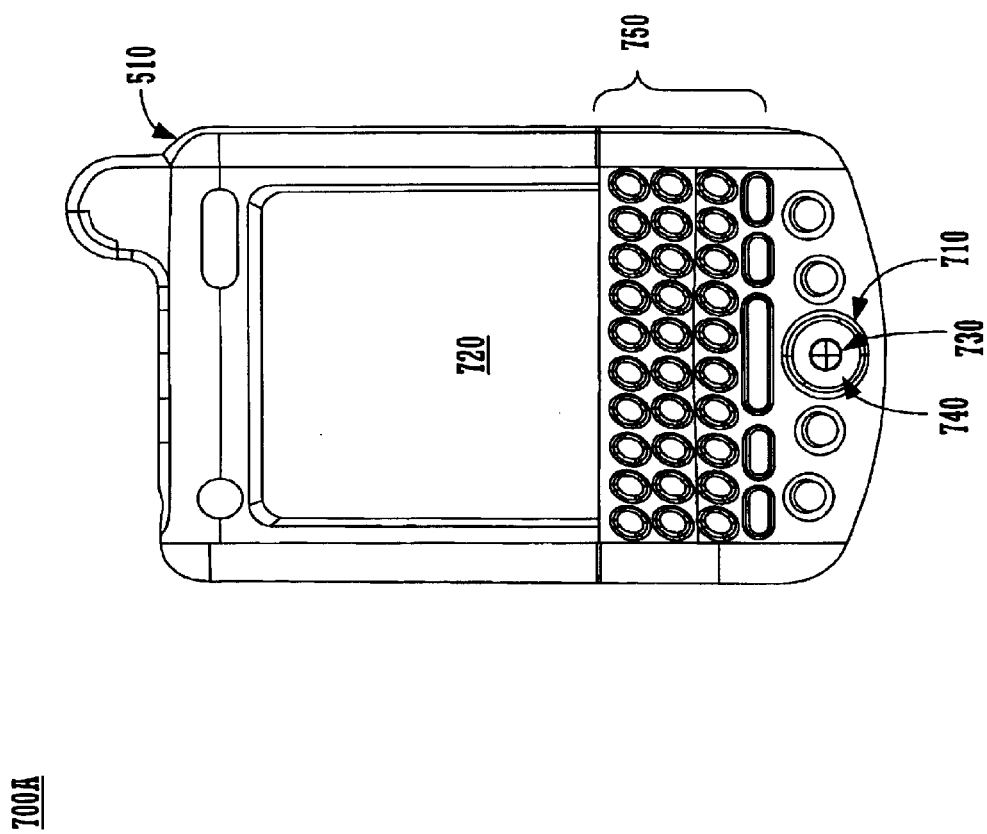
FIG. 7A is a topside perspective view of a portable electronic device in accordance with one embodiment of the present invention.

FIG. 7A is a topside perspective view 700a of the top face of portable electronic device 510 in accordance with one embodiment of the present invention. The top face contains a display screen 720. Display screen 720 is a touch screen that is able to register contact between the screen and the tip of a stylus. A keyboard 750 is below display screen 720 on the top face of device 510 and above navigation interface device 710. Navigation interface device 710 comprises a button 730 at the center and a surrounding ring 740.

Figure 7B:
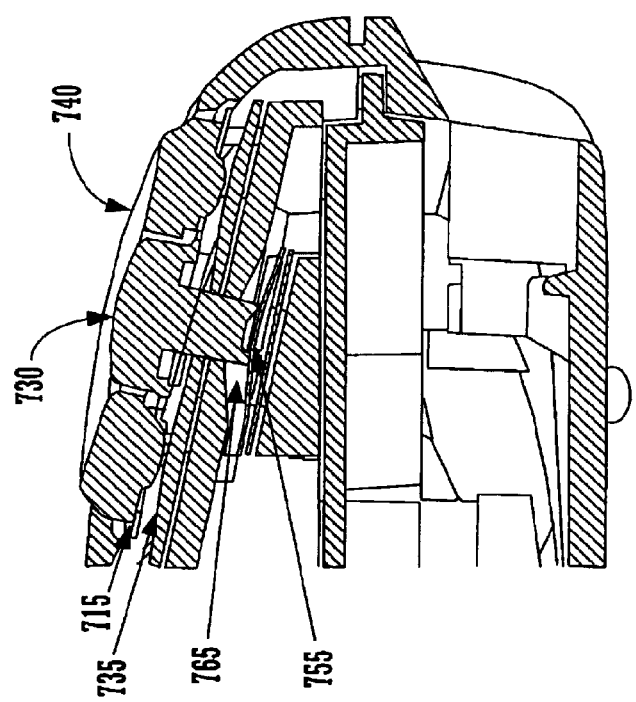
FIG. 7B is a cut-away side view of a portable electronic device in accordance with one embodiment of the present invention.
Figure 7C:
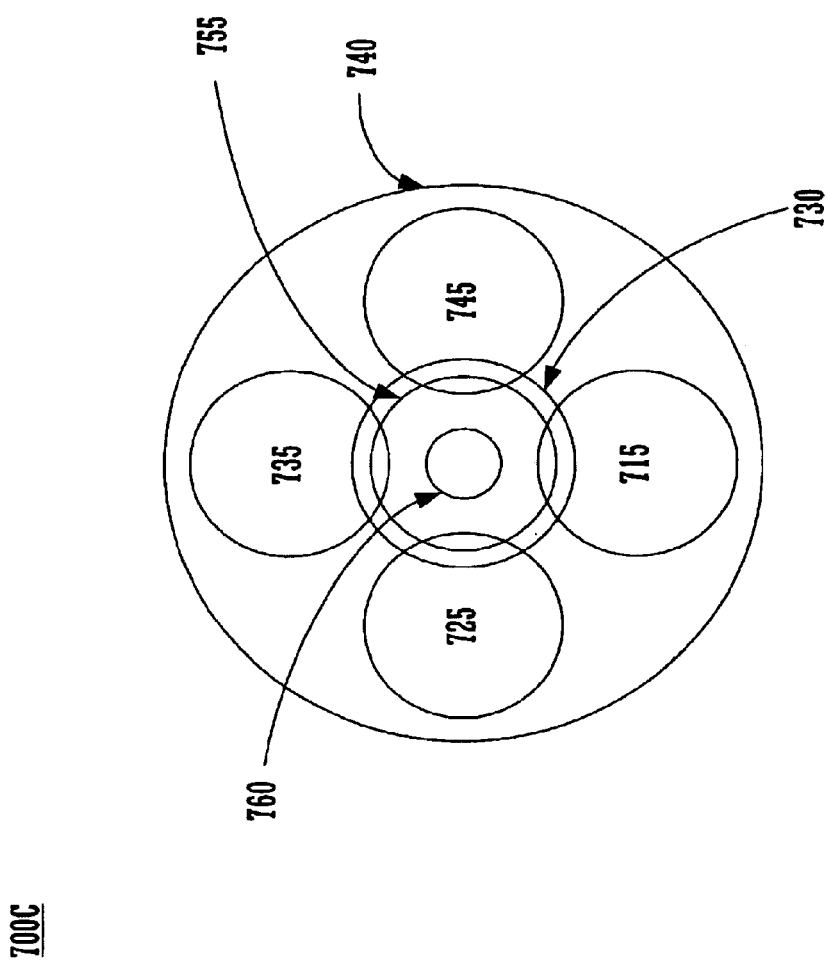
FIG. 7C is a top view of an arrangement of actuator domes in accordance with one embodiment of the present invention.

FIG. 7B is a cut-away side view of a multi-way navigation assembly 700b and navigation interface device (e.g., interface device 710 of FIG. 7A) within portable electronic device 510 in accordance with one embodiment of the present invention. FIG. 7C is a top view of an arrangement of actuator domes 715, 725, 735, 745 and 755 located on two planes within multi-way navigation assembly 700b in accordance with one embodiment of the present invention. By locating the actuator domes in two substantially parallel planes, one plane being offset from the other so that a space between the actuator domes on one plane aligns on an orthogonal axis with an actuator in the other plane, a smaller form factor may be achieved for an interface device (e.g. device 710 of FIG. 7A).

FIGS. 7B and 7C are discussed in concert to clearly describe assembly 700b. In one embodiment, ring 740 resides above actuator domes 715, 725, 735, and 745 and button 730 resides above actuator dome 755. The actuator domes are coupled to circuitry within a handheld device such as device 510 of FIG. 7A. Actuator domes 715, 725, 735 and 745 reside in one plane while actuator dome 755 resides in a separate, substantially parallel plane. In one embodiment actuator dome 755 may reside on the plane furthest from the navigation button 730 as shown in FIG. 7B. In another embodiment, dome 755 may reside on the plane closest to navigation button 730.

In the embodiment illustrated in FIG. 7B, ring 740 is designed to depress actuator 715, 725, 735 or 745 when pressed in a position above a specific actuator. Pressing a position that resides above and between two actuator domes may depress both domes in accordance with one embodiment of the present invention. Actuator dome 755, according to one embodiment, resides on a plane below actuator domes 715, 725, 735 and 745. A hole 760 in the center of actuator domes 715, 725, 735 and 745 provides access to actuator dome 755. According to one embodiment, button 730 has an extension 765 that fits through hole 760 so that pressing button 730 depresses dome 755, causing it to make contact with circuitry and respond accordingly. In one embodiment, button 730 is a select button that would cause an application to be opened.

Still referring to FIGS. 7B and 7C, according to one embodiment, pressing 740 at the 12 o'clock position causes actuator 735 to be depressed, making contact with the circuitry. This may cause a cursor or highlighting feature on a display screen (e.g., screen 720 of FIG. 7A) to move upward. Likewise, when ring 740 is pressed at the three o'clock position, actuator 745 is depressed and may cause a cursor or highlighting feature to move to the right on display screen 720. Pressing ring 740 at the one thirty o'clock position depresses both actuators 735 and 745. Pressing both actuator domes may, according to one embodiment, cause a cursor or highlighting feature to move diagonally up and to the right. Likewise, actuator 715 would be depressed by pressing the six o'clock position on ring 740 and actuator 725 would be depressed by pressing the nine o'clock position on ring 740. In one embodiment, combinations of two actuators are depressed by pressing a position on ring 740 that lies between them. The direction moved by the cursor or highlighting feature is a function of software and may vary depending on the program.

In another embodiment, additional buttons may be provided for navigating diagonally. These buttons may be separate buttons or they may be additional actuators. Additional actuators may be located in yet another substantially parallel plane that may be accessed by one of a series of concentric rings or by single buttons placed around ring 740. There may according to one embodiment, be several stacked parallel planes of actuators, accessed by various length extensions from a combination of concentric rings and buttons for navigation and for other appropriate functions.

The preferred embodiment of the present invention, a transparent cover with access to multi-way navigation assembly, is thus described. While the present invention has been described in particular embodiments, it should be appreciated that the present invention should not be construed as limited by such embodiments, but rather construed according to the below claims.

What is claimed is:

1. A cover comprising:
   a substantially transparent material having:
      a form factor that protects function buttons of a device from inadvertent actuation; and
      an opening of a size, shape and location to afford access to an interface apparatus for a multi-way navigation assembly located on a top face of said device, said opening allowing for navigating with said cover in place; and
   a mechanism for coupling said cover to said device, said mechanism comprising protrusions for snapping into cutouts located midway along the sides of said device.

2. The cover as described in claim 1 wherein said cover is storable on the back of said device while said device is in use.

3. The cover as described in claim 1 wherein said opening in said cover is circular.

4. The cover as described in claim 1 wherein said multi-way navigation assembly comprises actuators coupled to circuitry within said device.

5. The cover as described in claim 4 wherein said actuators comprise steel domes.

6. The cover as described in claim 4 wherein said actuators are actuated by pressing said interface device, said interface device comprising a ring surrounding a central button.

7. The cover as described in claim 6 wherein said ring interfaces with actuators situated substantially within a first plane.

8. The cover as described in claim 7 wherein said button interfaces with an actuator situated within a second plane.

9. The cover as described in claim 8 wherein actuators in said first plane are offset from said actuator in said second plane.

10. The cover as described in claim 9 wherein said button comprises an extension for depressing said actuator in said second plane through an opening in said first plane.

11. The cover as described in claim 1 wherein a power switch on said device is accessible with said cover in place.

12. A handheld computing device with a cover, said cover comprising:
    a substantially transparent material having:
       a form factor that protects function buttons of a device from inadvertent actuation; and
       an opening of a size, shape and location to afford access to an interface apparatus for a multi-way navigation assembly located on a top face of said device, said opening allowing for navigating with said cover in place, and wherein said multi-way navigation assembly comprises actuators coupled to circuitry within said device; and
    a mechanism for coupling said cover to said device.

13. The handheld computing device as described in claim 12 wherein said cover comprises protrusions for snapping into cutouts located midway along the sides of said device.

14. The handheld computing device as described in claim 12 wherein said cover is storable on the back of said device while said device is in use.

15. The handheld computing device as described in claim 12 wherein said opening in said cover is circular.

16. The handheld computing device as described in claim 12 wherein said actuators comprise steel domes.

17. The handheld computing device as described in claim 12 wherein said actuators are actuated by pressing said interface device, said interface device comprising a ring surrounding a central button.

18. The handheld computing device as described in claim 17 wherein said ring interfaces with actuators situated substantially within a first plane.

19. The handheld computing device as described in claim 18 wherein said button interfaces with an actuator situated within a second plane.

20. The handheld computing device as described in claim 19 wherein actuators in said first plane are offset from said actuator in said second plane.

21. The handheld computing device as described in claim 20 wherein said button comprises an extension for depressing said actuator in said second plane through an opening in said first plane.

22. The handheld computing device as described in claim 12 wherein a power switch on said device is accessible with said cover in place.

23. A portable electronic device comprising:
    circuitry disposable within a housing and coupleable to a computer system;
    a plurality of actuators for connecting to said circuitry, said actuators disposed within a first plane;
    an actuator for connecting to said circuitry, said actuator disposed within a second plane and wherein said first plane and said second plane are substantially parallel;
    an interface device on said housing, wherein said interface device is configured for actuating said actuators in said first plane and said second plane; and
    a movable transparent cover configured to allow access to said interface device when in place.

24. The portable electronic device of claim 23 wherein said actuators in said first plane are offset from said actuator in said second plane.

25. The portable electronic device of claim 23 wherein said interface device comprises a select button surrounded by a ring.

26. The portable electronic device of claim 25 wherein said select button comprises an extension for depressing said actuator in said second plane through a hole in said first plane.

27. A cover comprising:
a substantially transparent material having:
- a form factor that protects function buttons of a device from inadvertent actuation; and
- an opening of a size, shape and location to afford access to an interface apparatus for a multi-way navigation assembly located on a top face of said device, said opening allowing for navigating with said cover in place; and a mechanism for coupling said cover to said device and wherein said cover is storable on the back of said device while said device is in use.

28. The cover as described in claim 27, comprising protrusions for snapping into cutouts located midway along the sides of said device.

29. The cover as described in claim 27 wherein said opening in said cover is circular.

30. The cover as described in claim 27 wherein said multi-way navigation assembly comprises actuators coupled to circuitry within said device.

31. The cover as described in claim 30 wherein said actuators comprise steel domes.

32. The cover as described in claim 30 wherein said actuators are actuated by pressing said interface device, said interface device comprising a ring surrounding a central button.

33. The cover as described in claim 32 wherein said ring interfaces with actuators situated substantially within a first plane.

34. The cover as described in claim 33 wherein said button interfaces with an actuator situated within a second plane.

35. The cover as described in claim 34 wherein actuators in said first plane are offset from said actuator in said second plane.

36. The cover as described in claim 35 wherein said button comprises an extension for depressing said actuator in said second plane through an opening in said first plane.

37. The cover as described in claim 27 wherein said power switch on said device is accessible with said cover in place.

* * * * *